(12) United States Patent
Jensen (10) Patent No.: US 8,701,636 B2
(45) Date of Patent: Apr. 22, 2014

(54) VARIABLE INPUT DRIVING SYSTEM AND METHOD

(75) Inventor: Jeffrey Jensen, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 482 days.

(21) Appl. No.: 13/096,664

(22) Filed: Apr. 28, 2011

(65) Prior Publication Data

US 2012/0277971 A1    Nov. 1, 2012

(51) Int. Cl.
*F02B 33/00* (2006.01)
*F02B 33/44* (2006.01)

(52) U.S. Cl.
USPC ............. 123/561; 123/565; 60/607; 60/608

(58) Field of Classification Search
USPC ............... 123/559.3, 561, 565; 60/607, 608
See application file for complete search history.

(56) References Cited

U.S. PATENT DOCUMENTS

| | | | |
|---|---|---|---|
| 2,091,356 A | 8/1935 | Fawcett | |
| 2,467,077 A | 10/1943 | Brunken | |
| 2,769,303 A | 5/1953 | Lucia et al. | |
| 2,852,084 A | 11/1954 | Glamann | |
| 2,949,902 A | 8/1960 | Calovolo | |
| 4,927,333 A * | 5/1990 | Kato | ............. 417/316 |
| 5,060,622 A | 10/1991 | Suzuki | |
| 5,289,813 A * | 3/1994 | Adachi et al. | ............ 123/559.3 |
| 5,890,468 A * | 4/1999 | Ozawa | ............ 123/561 |
| 7,000,601 B2 * | 2/2006 | Yasui et al. | ............ 123/561 |
| 7,252,610 B2 * | 8/2007 | Miyata | ............ 474/122 |

FOREIGN PATENT DOCUMENTS

| | | |
|---|---|---|
| GB | 2 292 774 A | 3/1996 |
| JP | 61066816 A | 5/1986 |
| JP | 01232118 A | 9/1989 |
| JP | 08210144 A | 8/1996 |
| JP | 08260995 A | 10/1996 |

* cited by examiner

*Primary Examiner* — Thomas Moulis
(74) *Attorney, Agent, or Firm* — Leydig, Voit & Mayer (57) ABSTRACT

A variable-input driving system includes first and second rotatable components rotating at different speeds. First and second sensors measure the rotation of the first and second components, and provide signals to an electronic controller. A drive selector has an input connected to each of the first and second components and an output connected to a driven component. The drive selector is responsive to a command signal from the electronic controller to selectively engage the first or second input with the output such that rotation of the first or second input is transmitted to the driven component based on the first and second signals.

20 Claims, 5 Drawing Sheets

VARIABLE INPUT DRIVING SYSTEM AND METHOD

TECHNICAL FIELD

This patent disclosure relates generally to vehicle or machine powertrains and, more particularly, to powertrains having engine-driven accessories associated therewith.

BACKGROUND

Engine-driven accessories, such as alternators, generators, air compressors, fluid pumps, fans, superchargers and other accessories are known. In the known configurations, such accessories are mechanically connected to an output shaft of the engine, such as a crankshaft, by use of belts, chains, shafts and other mechanical power transmission arrangements. During operation, each accessory is configured to receive motive power from the engine, thus consuming a portion of the engine's useable power output. Although a certain portion of the engine's power output is required to drive certain accessories, there are various operating conditions of the engine at which the power consumed by accessories exceeds the benefit provided by those accessories to the operation of the vehicle, machine and/or engine. Power drains or loads such as these are commonly referred to as parasitic loads. Parasitic loads, in general, are unavoidable and can reduce the overall fuel economy of an engine.

The mechanical connection that drives various engine-driven accessories often requires that the accessories are installed close to the engine, either on the engine or within an engine compartment of the vehicle or machine. When driven in this way, the accessories are preferably designed to withstand high operating temperatures. In certain instances, such as in the case of superchargers, fuel pumps, etc., coolers to remove heat from the working fluids of the accessories are employed to counteract the heating of those fluids imparted by the presence of the accessory on or close to the engine.

SUMMARY

The disclosure describes, in one aspect, a variable-input driving system for transmitting driving power between an output shaft of a prime mover and an input shaft of a driven component. The output shaft is rotatable at a prime mover driving speed. A first rotatable component is configured to rotate at a first speed due to rotation of the output shaft when the output shaft is rotating at the driving speed. A first sensor is disposed to measure a rotation of the first rotatable component and to provide a first signal indicative of the rotation of the first rotatable component. A second rotatable component is configured to rotate at a second speed due to rotation of the output shaft when the output shaft is rotating at the driving speed. A second sensor is disposed to measure a rotation of the second rotatable component and to provide a second signal indicative of the rotation of the second rotatable component. A drive selector has a first input, a second input and an output. The first input is rotatably associated with the first rotatable component, the second input is rotatably associated with the second rotatable component, and the output is rotatably associated with the input shaft of the driven component. The drive selector is responsive to a command signal to selectively engage the first input or the second input with the output such that rotation of the first or second input is transmitted to the driven component. An electronic controller is configured to receive the first and second signals and to provide the command signal based on the first and second signals.

In another aspect, the disclosure describes a method for operating a variable-input driving system that transmits driving power between an output shaft of a prime mover and an input shaft of a driven component. The output shaft is rotatable at a prime mover driving speed. The method includes determining first and second rotational speeds of components associated with the prime mover, and providing the first and second rotational speeds to a controller. A desired rotation speed is determined in the controller as between the first and second rotational speeds, and a command is provided to a drive selector based on the desired rotational speed. The driven component is caused to operate at the desired rotational speed by engaging one of first and second rotatable components connected to the prime mover with the input shaft of the driven component.

In yet another aspect, the disclosure describes a powertrain for a vehicle or machine. The powertrain includes an engine having an output shaft connected to a transmission through a torque converter. The transmission has a gear set, an input transfer gear disposed between the gear set and the torque converter, and an output gear set. A supercharger is disposed to provide pressurized fluid to an intake manifold of the engine. The powertrain further includes a first rotatable component configured to rotate at a first speed due to rotation of the output shaft when the output shaft is rotating at the driving speed. A first sensor is disposed to measure a rotation of the first rotatable component and to provide a first signal indicative of the rotation of the first rotatable component. A second rotatable component is configured to rotate at a second speed due to rotation of the output shaft when the output shaft is rotating at the driving speed. A second sensor is disposed to measure a rotation of the second rotatable component and to provide a second signal indicative of the rotation of the second rotatable component. A drive selector has a first input, a second input and an output. The first input is rotatably associated with the first rotatable component, the second input is rotatably associated with the second rotatable component, and the output is rotatably associated with the supercharger. The drive selector is responsive to a command signal to selectively engage the first input or the second input with the output such that rotation of the first or second input is transmitted to the supercharger. An electronic controller is configured to receive the first and second signals and provide the command signal based on the first and second signals.

DETAILED DESCRIPTION

This disclosure relates to engine-driven accessories for internal combustion engines. More particularly, the disclosure relates to variably selectable driving sources in a powertrain engine and transmission combination. In the disclosed embodiments, operating efficiency may be improved by switching the input driver of the engine-driven component from one input driver to another depending on the operating conditions of the powertrain. The switching can be accomplished by use of clutches or other power transmission devices that are responsive to command signals from an electronic controller. Thus, parasitic loads on the engine can be reduced and other advantages may be realized, as is set forth in more detail in the disclosure that follows.

Figure 1:
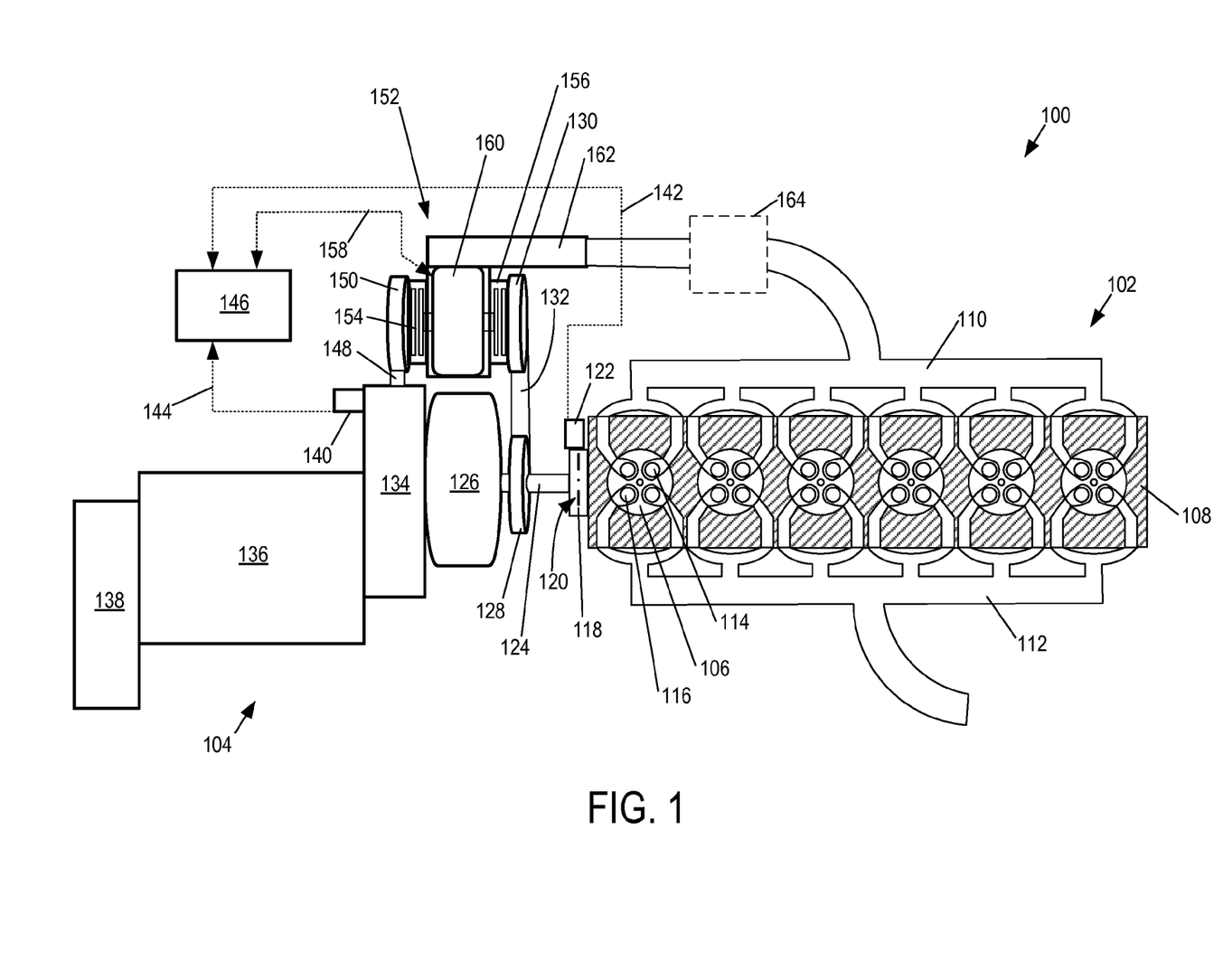
FIG. 1 is a block diagram of a powertrain including an engine and transmission in accordance with the disclosure.

A block diagram of a powertrain 100 including an engine 102 connected to a transmission 104 is shown in FIG. 1. Although the engine 102 is illustrated as an internal combustion engine, any other type of prime mover, such as an electrically or hydraulically powered motor, may be used. The engine 102 includes a plurality of cylinders 106 formed within a cylinder block 108 (shown in section), each of which is in fluid communication with an intake manifold 110 and an exhaust collector 112. Intake valves 114 and exhaust valves 116 are configured to fluidly isolate the cylinder 106 from the intake manifold 110 and exhaust collector 112, respectively.

Reciprocating pistons (not shown) disposed within the cylinders 106 impart a rotary motion to a crankshaft 118 of the engine 102 in the known fashion. The crankshaft 118 may include various marks or indicia 120 that are detectable by a crankshaft sensor 122. The crankshaft 118 may be connected to an engine output shaft 124, which may alternatively be part of or an extension of the crankshaft 118. The engine output shaft 124 is connected to a torque converter 126. The torque converter 126 in the illustrated embodiment is a fluid coupling that is used to transfer rotating power from a prime mover, such as the engine 102, to the transmission 104. The torque converter 126 is configured to multiply torque such that the rotational speed at its output is different, typically lower, than the rotation speed at the engine output shaft 124.

A first engine output pulley 128 is connected to the engine output shaft 124. Although a pulley/drive arrangement is shown and described in certain embodiments described herein, any other mechanical drive arrangement may be used. As shown, the first engine output pulley 128 is rotationally related to a second engine output pulley 130 via a belt 132. Although a direct connection is shown between the first and second engine output pulleys 128 and 130, as well as between the first engine output pulley and the engine output shaft 124, gear reduction devices may be used anywhere between the output shaft 124 and the second engine output pulley 130. Such gear reduction devices (not shown) can be embodied in any suitable component configuration, such as gearboxes, a reduction ratio between the first and second engine output pulleys 128 and 130, additional pulleys and the like. Moreover, although two pulleys are shown, additional pulleys such as idler pulleys may be used. Alternatively, a chain and sprocket drive arrangement may be used instead of the pulley and belt arrangement.

An output of the torque converter 126 is connected to an input transfer gear 134 of the transmission 104. The input transfer gear 134 drives one or more transmission gear sets 136, which may be selectively engaged during operation. Motion at the output of the gear sets 136 is transferred to various machine components and systems (not shown) such as drive shafts, generators, pumps and the like via an output transfer gear 138. A suitable rotating component of the input transfer gear 134 may include marks or other indicia (not shown) that are detectable by a sensor 140. The sensor 140, as well as the crankshaft position sensor 122, are connected via communication lines 142 and 144, respectively, to an electronic controller 146.

A rotating member within the input transfer gear 134 drives a belt 148, which in turn drives a transmission output pulley 150. The transmission output pulley 150 and the second engine output pulley 130 are connected to a drive selector 152 via respective clutches 154 and 156. In an alternative embodiment, the drive selector 152 may include the sensors 122 and 140 in association with the pulleys 130 and 150. Selective engagement of either of the two clutches 154 or 156 can be accomplished in response to a command signal provided via communication line 158 from the electronic controller 146. In this way, the drive selector 152 may selectively engage input power to a driven device. In the embodiments illustrated herein, a supercharger driver 160 is shown as one exemplary device that may be driven but drivers to drive other types of devices may be used. The supercharger driver 160 is may be selectively driven by power provided to the drive selector 152 either from the engine output shaft 124 or from the input transfer gear 134. In other words, the supercharger driver 160, which is connected to and configured to drive the supercharger 162, can be powered at variable speeds from either the input or output side of the torque converter 126. In the illustrated embodiment, pressurized air from the supercharger 162 may optionally pass through an after-cooler 164 before being provided to the intake manifold 110.

Figure 2:
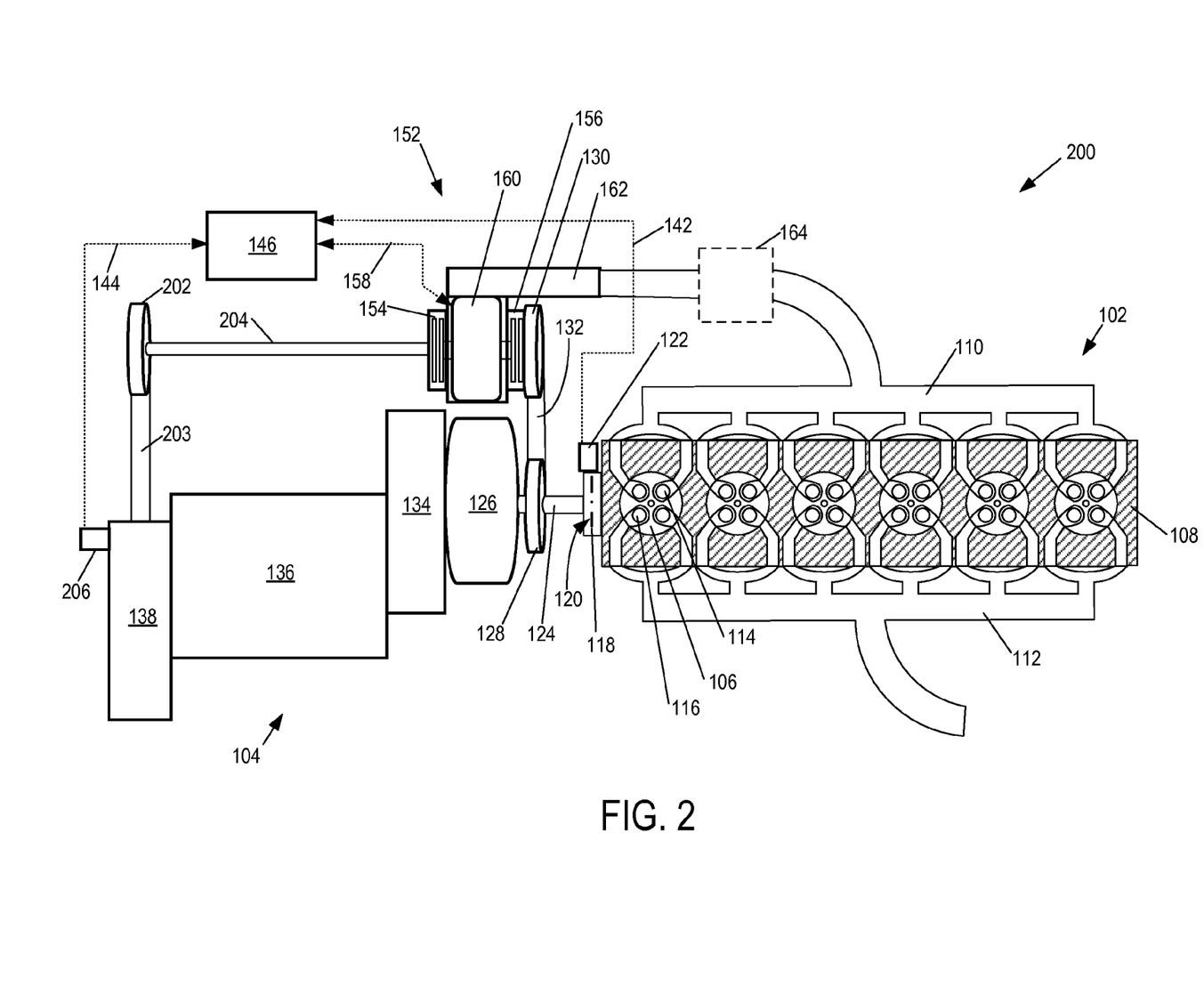
FIG. 2 is a block diagram of an alternative embodiment of a powertrain in accordance with the disclosure.
Figure 3:
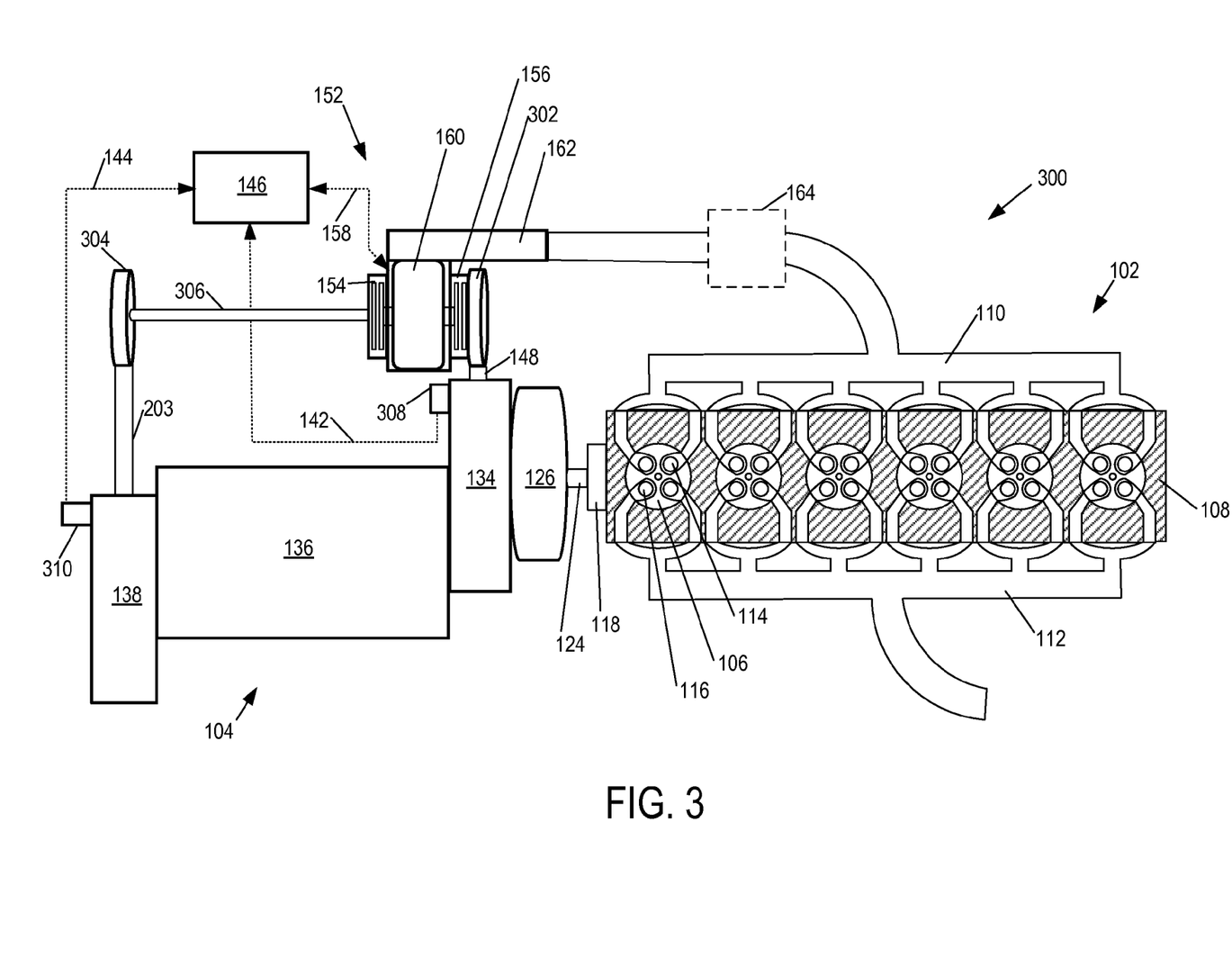
FIG. 3 is a block diagram of an additional alternative embodiment for a powertrain in accordance with the disclosure.

Two alternative embodiments are shown in FIGS. 2 and 3. In the description that follows, elements and systems that are the same or similar to corresponding elements and systems previously described are denoted by the same reference numerals as previously used for simplicity. In reference to the embodiment shown in FIG. 2, a powertrain 200 includes two connections to power the drive selector 152. Of the two connections, the first connection includes first and second engine output pulleys 128 and 130 that are driven by the engine output shaft 124 in a fashion similar to that of the embodiment for the powertrain 100 shown in FIG. 1. However, the second connection in this embodiment is driven from the output transfer gear 138 rather than the input transfer gear 134 as was previously discussed relative to FIG. 1.

More specifically, a transmission output pulley 202 is associated with and powered by the output transfer gear 138 via, for example, a belt 203 that is driven by a rotating component (not shown) within the output transfer gear 138. Rotary motion of the transmission output pulley 202 is transferred to the corresponding clutch 154 of the drive selector 152 via a driveshaft 204. A sensor 206 is configured to sense the rotational position or angular speed of a rotating component (not shown) of the output transfer gear 138 and provide information to the electronic controller 146 via a communication line 144. In the embodiment shown in FIG. 2, unlike in the embodiment shown in FIG. 1, the transmission output pulley 202 can be used to drive the supercharger 162. This means that the driving speed of the supercharger 162 can be variable depending on the gear selection of the transmission 104. Moreover, when the transmission 104 is set in a parked or neutral setting, the transmission output pulley 202 will be stationary. Similarly, the drive speed of the pulley 202 will change when different gear selections are made in the transmission 104.

In reference now to the embodiment shown in FIG. 3, a powertrain 300 includes two connections to power the drive selector 152. In this embodiment, connections are made using the input and output transfer gears 134 and 138 of the transmission 104. The engine output shaft 124 is not used directly to drive the supercharger 162 as it was in the previous two embodiments. Accordingly, a first input pulley 302 of the drive selector 152 is driven by the belt 148 associated with the input transfer gear 134. A second input pulley 304 is driven by the belt 203 associated with the output transfer gear 138. The second input pulley 304 is configured to transfer motion to the drive selector 152 via a driveshaft 306. Although a driveshaft (204, 306) is shown in FIGS. 2 and 3, the drive selector 152 may be located elsewhere in the system such that a driveshaft will not be necessary. Moreover, other driving means may be used in place of the driveshaft in the present embodiments, such as gear-sets, belts, chains and others.

In this embodiment, a first sensor 308 is disposed to measure a rotational position or speed of a rotating component in the input transfer gear 134 and transmit information to the electronic controller 146 via communication line 142. A second sensor 310 is similarly disposed to measure a rotational position or speed of a rotating component in the output transfer gear 138 and transmit information to the electronic controller 146 via communication line 144. As in the embodiments shown in FIGS. 1 and 2, the electronic controller 146 is configured to select a preferred drive source for the supercharger 162 by instructing the drive selector 152 to engage the clutch 154 or the clutch 156 based on information provided from the sensors on communication lines 142 and 144.

Figure 4:
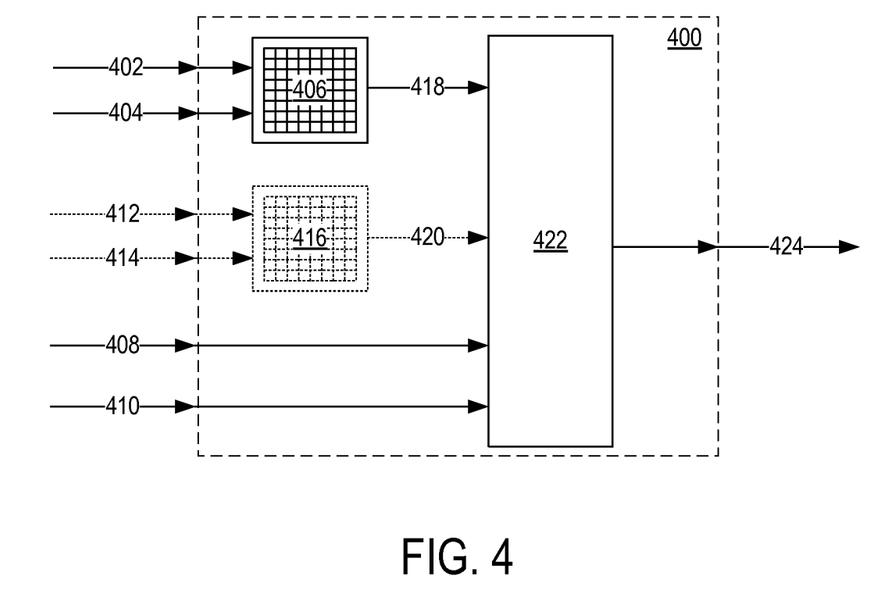
FIG. 4 is a block diagram for a control in accordance with the disclosure.

A block diagram of a control 400 for selecting a preferred drive source for the supercharger 162 is shown in FIG. 4. The control 400 may operate in the form of computer executable instructions within electronic controller 146. The electronic controller 146 may be a single controller or may include more than one controller disposed to control various functions and/or features of a vehicle or machine. For example, a master controller, used to control the overall operation and function of the machine, may be cooperatively implemented with a motor or engine controller used to control the engine 102 and/or the transmission 104. In the presently described embodiments, the term "controller" is meant to include one, two, or more controllers that may be associated with a machine and powertrains 100, 200 and 300, and that may cooperate in controlling various functions and operations. The functionality of the controller, while shown conceptually in FIG. 4 to include various discrete functions for illustrative purposes only, may be implemented in hardware and/or software without regard to the discrete functionality shown. Accordingly, various interfaces of the controller are described relative to components of the drive train shown in FIGS. 1-3. Such interfaces are not intended to limit the type and number of components that are connected, nor the number of controllers that are described.

Accordingly, the control 400 is configured to receive as inputs various signals indicative of operating parameters of a drive train or, more generally, operating parameters of a vehicle or machine in which the drive train is operating. More specifically, in the simplified embodiment for the control 400 shown in FIG. 4, engine speed 402 and engine load 404 signals are provided to a lookup table 406. Further inputs include a first rotational speed 408 and a second rotational speed 410 that are provided from speed sensors associated with respective inputs to drive a supercharger of the engine as shown, for example, in FIGS. 1-3. In reference to these figures, the first and second sensors may be embodied as sensors 122 and 140 as shown in FIG. 1, sensors 122 and 206 as shown in FIG. 2, or sensors 308 and 304 as shown in FIG. 3.

Additional inputs may optionally be provided. For example, additional inputs denoted in dotted line may optionally be provided such as a gear selection 412, which is indicative of the gear selection of the transmission when an input to the driven device, which is shown as a supercharger in the illustrated embodiment although other devices may be used, is taken from the output transfer gear as shown in FIGS. 2 and 3, and a ground speed 414, which is indicative of the ground speed of the machine or vehicle. These optional inputs are provided to an optional lookup table 416.

The lookup table 406, which may alternatively be a function, computational model, or any other suitable computational element, is configured to determine a desired or required engine airflow, which in the case of a supercharger corresponds to a desired supercharger speed 418 that is provided at the output of the table 406. The desired supercharger speed 418 may be adjusted or corrected using other system parameters, such as an efficiency term for the supercharger driving components, as well as environmental parameters to correct the desired airflow, such as intake manifold pressure, intake air temperature, ambient temperature, barometric pressure and others.

The optional lookup table 416, when present, is configured to determine a scale factor 420 that accounts for various parameters, such as the gear setting of the transmission, as well as other factors that can affect the speed of the supercharger driving components, such as wheel or track speed of the vehicle or machine, traction, and others. The scale factor 420 and the desired supercharger speed 418 are provided to an input selector function 422.

The input selector function 422 is further configured to receive the first and second rotational speeds 408 and 410. In the illustrated embodiment, the input selector function 422 includes a modeling algorithm that is configured to provide a selection signal 424, which is operable to command the selection of one of the inputs to a driver of the supercharger. For example, in the embodiments shown in FIGS. 1-3, the selection signal 424 is carried on communication line 158 and effects the selective engagement of clutch 154 or clutch 156 such that the supercharger 162 may be powered by one or the other motive power source.

During operation, the selection of the appropriate input to drive the supercharger is accomplished such that overall fuel economy and engine performance can be improved. Such improvements may be defined either in the specific model implemented within the input selector function 422 and/or within the tabulated information in table 406 (and table 416). For example, when the control 400 determines that the engine is operating at a low idle condition while the transmission is in the idle or park settings, the input having the lowest (or zero) speed may be used to stop the supercharger from operating, thus reducing the parasitic load on the engine and improving fuel economy. In other operation conditions, for example, when the engine is accelerating, the input having the highest speed may be used to ensure that the supercharger has sufficient power to supply air to the engine.

INDUSTRIAL APPLICABILITY

The present disclosure is applicable to any type of vehicle, machine or stationary application having an internal combustion engine, especially those engines that are connected to a transmission or another device that includes rotatable components that rotate under power from the engine but at different speeds than the engine. The disclosure includes an input selector device that is configured to receive a power input from more than one selectable inputs and transfer that power to drive a driven device, such as a supercharger, pump, compressor, generator and others. The input selection is controlled by an electronic controller, which optimizes the power input to the driven device to improve fuel economy and performance of the vehicle, machine, stationary application and/or engine.

Figure 5:
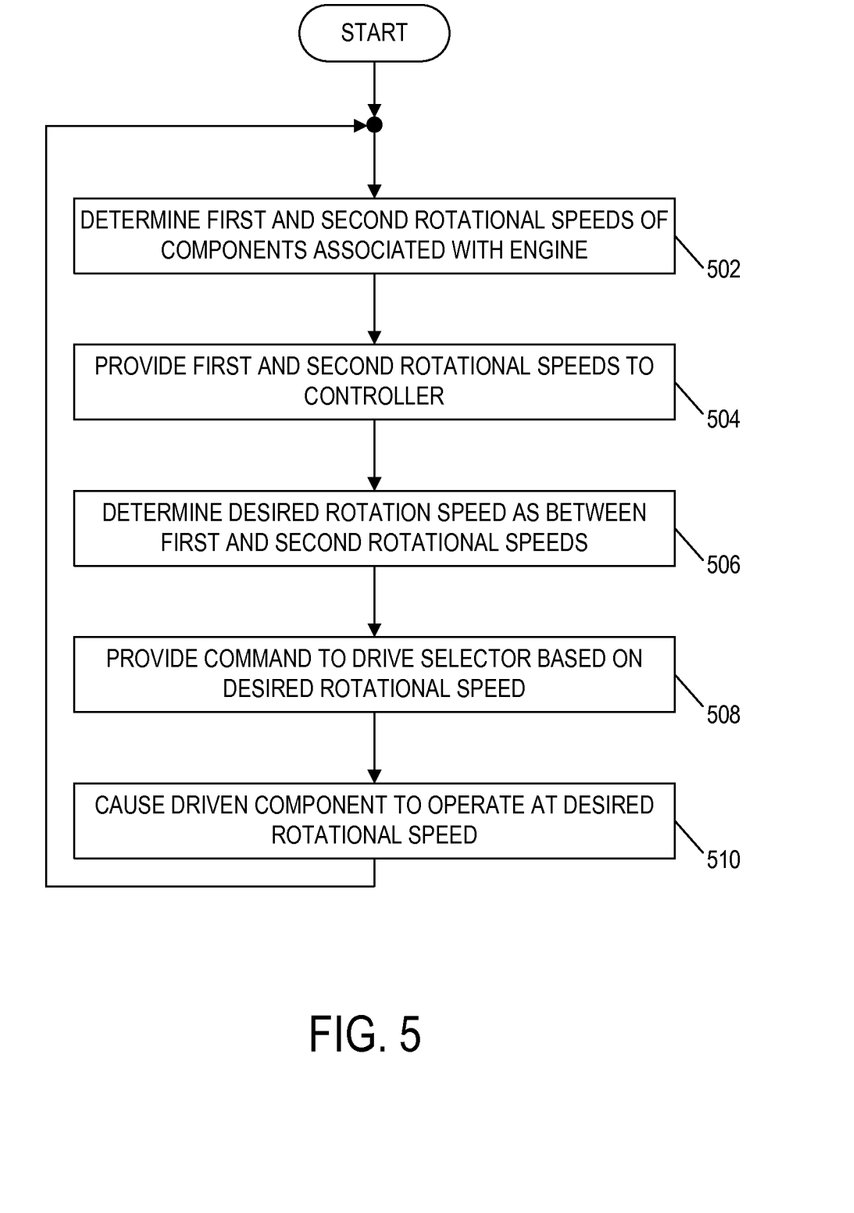
FIG. 5 is a flowchart for a method in accordance with the disclosure.

A flowchart for a method of variably controlling the selection of a power source provided for a driven accessory is shown in FIG. 5. In one embodiment, the method applies to the selection of the power source that is connected to the driven component. The driven component, such as a supercharger, generator, alternator, pump, or other type of device, may be selectively connectable to rotate under the power of different rotatable components associated with an engine. Suitable components that can provide power to the accessory can be the engine's crankshaft, an output shaft of a torque converter, a rotating component associated with an input transfer gear of a transmission, a rotating component associated with an output transfer gear of the transmission, an electric, hydraulic or pneumatic motor, and others.

The method includes measuring or otherwise determining at least two angular speeds, for example, a first rotational speed and a second rotational speed, of at least two components associated with the engine at 502. Alternatively, one of the first and second components may be a part of the engine itself. As previously described, the first and second rotational speeds may be measured by dedicated sensors, but may otherwise generally be determined by non-dedicated sensors or inferred by other means. The two rotational speeds are provided to a controller at 504. The controller is configured to receive and process this rotational speed information. As between the at least two rotational speeds provided to the controller, the controller determines the desired rotational speed at 506.

In this context, the desired rotational speed is used to suggest one of a plurality of available speeds, including engine speed, at which a driven accessory is powered such that it operates more efficiently as compared to operating at any of the other available speeds. When two speeds are available, meaning that the driven component is configured to be selectively driven by one of two power sources, the desired speed may be selected from between the two available speeds and be equal to the selected speed.

Having determined the desired rotational speed at 506, the controller may provide a command to a drive selector at 508. The drive selector is a device that can selectively engage one of two or more power inputs to a power output. The power output from the drive selector is connected to the driven component. In one embodiment, for example, the drive selector may include two sets of clutches, each set of clutch having an input and an output shaft. The output shafts of both clutches are connected, for example, via gears, to an input shaft of a component such as a supercharger. A pulley is connected to each clutch input shaft. Each pulley may be rotatably associated with a driving pulley via a belt. Each driven pulley may be configured to rotate with a driving component such as an engine crankshaft or camshaft. The drive selector may further include actuators, such as electric solenoids, that are responsive to signals and/or commands from the controller to engage one of the two clutches such that driving power from the corresponding driving component can be provided to the driven component. In this way, the drive selector command provided at 508 may cause the driven component to rotate at the desired rotational speed at 510. The process repeats continuously during operation.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

I claim:

1. A variable-input driving system for transmitting driving power between an output shaft of a prime mover, the output shaft being rotatable at a driving speed of the prime mover, and an input shaft of a driven component, comprising:
    a first rotatable component configured to rotate at a first speed due to rotation of the output shaft when the output shaft is rotating at the driving speed;
    a first sensor disposed to measure a rotation of the first rotatable component and provide a first signal indicative of the rotation of the first rotatable component;
    a second rotatable component configured to rotate at a second speed due to rotation of the output shaft when the output shaft is rotating at the driving speed;
    a second sensor disposed to measure a rotation of the second rotatable component and provide a second signal indicative of the rotation of the second rotatable component;
    a drive selector having a first input, a second input, and an output, the first input being rotatably associated with the first rotatable component, the second input being rotatably associated with the second rotatable component, and the output being rotatably associated with the input shaft of the driven component, the drive selector responsive to a command signal to selectively engage the first input or the second input with the output such that rotation of the first or second input is transmitted to the driven component; and
    an electronic controller configured to receive the first and second signals, and provide the command signal based on the first and second signals.

2. The variable-input driving system of claim 1, wherein the first and second rotatable components are selected from the group consisting of an engine crankshaft, an engine output shaft, an input shaft of a torque converter, an output shaft of the torque converter, an input transfer gear of a transmission, an output transfer gear of the transmission, an engine camshaft, and an output shaft of a motor.

3. The variable-input driving system of claim 1, wherein the prime mover is an engine having an intake manifold, and wherein the driven component is a supercharger configured to provide pressurized fluid to the intake manifold.

4. The variable-input driving system of claim 3, further comprising:
    a first engine output pulley connected to an engine output shaft;
    a second engine output pulley connected to the first input of the drive selector;
    a belt rotationally engaging the first engine output pulley with the second engine output pulley;
    a rotating component associated with an input transfer gear of a transmission;
    a transmission output pulley connected to the second input of the drive selector;
    an additional belt rotationally engaging the rotating component with the transmission output pulley; and
    a torque converter connected between the engine output shaft and the transmission.

5. The variable-input driving system of claim 3, further comprising:
   a first engine output pulley connected to an engine output shaft;
   a second engine output pulley connected to the first input of the drive selector;
   a belt rotationally engaging the first engine output pulley with the second engine output pulley;
   a rotating component associated with an output transfer gear of a transmission;
   a transmission output pulley connected to the second input of the drive selector and being rotatably connected to the rotating component; and
   a torque converter connected between the engine output shaft and the transmission.

6. The variable-input driving system of claim 3, further comprising:
   a first input pulley connected to the first input of the drive selector;
   a rotating component associated with an input transfer gear of a transmission;
   a belt rotationally engaging the first input pulley with the rotating component associated with the input transfer gear of the transmission;
   a rotating component associated with an output transfer gear of the transmission;
   a second input pulley connected to the second input of the drive selector and being rotatably connected to the rotating component associated with the output transfer gear of the transmission; and
   a torque converter connected between the engine and the transmission.

7. The variable-input driving system of claim 1, wherein the electronic controller is further configured to:
   determine an operating efficiency of the driven component for each of the first and second signals;
   provide the command signal such that the first input is engaged when it is determined that the driven component is expected to operate more efficiently when driven at the rotation of the first rotatable component; and
   provide the command signal such that the second input is engaged when it is determined that the driven component is expected to operate more efficiently when driven at the rotation of the second rotatable component,
   wherein the operating efficiency of the driven component includes at least one of fuel consumption of the prime mover and performance of the prime mover.

8. The variable-input driving system of claim 1, wherein the driven component is an engine-driven accessory associated with the prime mover and selected from the group consisting of a supercharger, a generator, an alternator, and a pump.

9. A method for operating a variable-input driving system that transmits driving power between an output shaft of a prime mover, the output shaft being rotatable at a driving speed of the prime mover, and an input shaft of a driven component, the method comprising:
   determining first and second rotational speeds of components associated with the prime mover;
   providing the first and second rotational speeds to a controller;
   determining a desired rotational speed in the controller as between the first and second rotational speeds;
   providing a command to a drive selector based on the desired rotational speed; and
   causing the driven component to operate at the desired rotational speed by engaging one of a first and second rotatable components connected to the prime mover with the input shaft of the driven component.

10. The method of claim 9, further comprising:
    providing a first rotatable component configured to rotate at a first speed due to rotation of the output shaft when the output shaft is rotating at the driving speed;
    providing a first sensor disposed to measure a rotation of the first rotatable component;
    providing a first signal from the first sensor, the first signal being indicative of the rotation of the first rotatable component;
    providing a second rotatable component configured to rotate at a second speed due to rotation of the output shaft when the output shaft is rotating at the driving speed;
    providing a second sensor disposed to measure a rotation of the second rotatable component;
    providing a second signal indicative of the rotation of the second rotatable component; and
    providing a command signal to the drive selector based on the first and second signals,
    wherein the drive selector has a first input, a second input and an output, the first input being rotatably associated with the first rotatable component, the second input being rotatably associated with the second rotatable component, and the output being rotatably associated with the input shaft of the driven component, the drive selector responsive to the command signal to selectively engage the first input or the second input with the output such that rotation of the first or second input is transmitted to the driven component.

11. The method of claim 10, wherein the prime mover is an engine having an intake manifold, and wherein the driven component is a supercharger configured to provide pressurized fluid to the intake manifold.

12. The method of claim 11, further comprising:
    providing a first engine output pulley connected to an engine output shaft;
    providing a second engine output pulley connected to the first input of the drive selector;
    rotationally engaging the first engine output pulley with the second engine output pulley with a belt;
    providing a rotating component associated with an input transfer gear of a transmission;
    providing a transmission output pulley connected to the second input of the drive selector;
    providing an additional belt rotationally engaging the rotating component with the transmission output pulley; and
    providing a torque converter connected between the engine output shaft and the transmission.

13. The method of claim 11, further comprising:
    providing a first engine output pulley connected to an engine output shaft;
    providing a second engine output pulley connected to the first input of the drive selector;
    rotationally engaging the first engine output pulley with the second engine output pulley with a belt;
    providing a rotating component associated with an output transfer gear of a transmission;
    providing a transmission output pulley connected to the second input of the drive selector and being rotatably connected to the rotating component; and
    providing a torque converter connected between the engine output shaft and the transmission.

14. The method of claim 11, further comprising:
providing a first input pulley connected to the first input of the drive selector;
providing a rotating component associated with an input transfer gear of a transmission;
rotationally engaging the first input pulley with the rotating component associated with the input transfer gear of the transmission;
providing a rotating component associated with an output transfer gear of the transmission;
providing a second input pulley connected to the second input of the drive selector and being rotatably connected to the rotating component associated with the output transfer gear of the transmission; and
providing a torque converter connected between the engine and the transmission.

15. The method of claim 10, further comprising:
determining an operating efficiency of the driven component for each of the first and second signals;
providing the command signal such that the first input is engaged when it is determined that the driven component is expected to operate more efficiently when driven at the rotation of the first rotatable component; and
providing the command signal such that the second input is engaged when it is determined that the driven component is expected to operate more efficiently when driven at the rotation of the second rotatable component,
wherein the operating efficiency of the driven component includes at least one of fuel consumption of the prime mover and performance of the prime mover.

16. A powertrain for a vehicle or machine, the powertrain including an engine having an output shaft connected to a transmission through a torque converter, the output shaft rotating at a driving speed, the transmission having a gear set, an input transfer gear disposed between the gear set and the torque converter, and an output transfer gear, the powertrain further comprising a supercharger disposed to provide pressurized fluid to an intake manifold of the engine, the powertrain further comprising:
a first rotatable component configured to rotate at a first speed due to rotation of the output shaft when the output shaft is rotating at the driving speed;
a first sensor disposed to measure a rotation of the first rotatable component and provide a first signal indicative of the rotation of the first rotatable component;
a second rotatable component configured to rotate at a second speed due to rotation of the output shaft when the output shaft is rotating at the driving speed;
a second sensor disposed to measure a rotation of the second rotatable component and provide a second signal indicative of the rotation of the second rotatable component;
a drive selector having a first input, a second input and an output, the first input being rotatably associated with the first rotatable component, the second input being rotatably associated with the second rotatable component, and the output being rotatably associated with the supercharger, the drive selector being responsive to a command signal to selectively engage the first input or the second input with the output such that rotation of the first or second input is transmitted to the supercharger; and
an electronic controller configured to receive the first and second signals, and provide the command signal based on the first and second signals.

17. The powertrain of claim 16, further comprising:
a first engine output pulley connected to the output shaft;
a second engine output pulley connected to the first input of the drive selector;
a belt rotationally engaging the first engine output pulley with the second engine output pulley;
a rotating component associated with the input transfer gear of the transmission;
a transmission output pulley connected to the second input of the drive selector; and
an additional belt rotationally engaging the rotating component with the transmission output pulley.

18. The powertrain of claim 16, further comprising:
a first engine output pulley connected to the output shaft;
a second engine output pulley connected to the first input of the drive selector;
a belt rotationally engaging the first engine output pulley with the second engine output pulley;
a rotating component associated with the output transfer gear of the transmission; and
a transmission output pulley connected to the second input of the drive selector and being rotatably connected to the rotating component.

19. The powertrain of claim 16, further comprising:
a first input pulley connected to the first input of the drive selector;
a rotating component associated with the input transfer gear of the transmission;
a belt rotationally engaging the first input pulley with the rotating component associated with the input transfer gear of the transmission;
a rotating component associated with the output transfer gear of the transmission; and
a second input pulley connected to the second input of the drive selector and being rotatably connected to the rotating component associated with the output transfer gear of the transmission.

20. The powertrain of claim 16, wherein the electronic controller is further configured to:
determine an operating efficiency of the supercharger for each of the first and second signals;
provide the command signal such that the first input is engaged when it is determined that the supercharger is expected to operate more efficiently when driven at the rotation of the first rotatable component; and
provide the command signal such that the second input is engaged when it is determined that the supercharger is expected to operate more efficiently when driven at the rotation of the second rotatable component, and
wherein the operating efficiency of the supercharger includes at least one of fuel consumption of the engine and transient performance of the engine.

* * * * *